Aug. 26, 1941.    J. A. CALDWELL    2,253,928
CONTROL INSTRUMENT
Filed Aug. 3, 1938    4 Sheets-Sheet 1
FIG. 1.
FIG. 2.
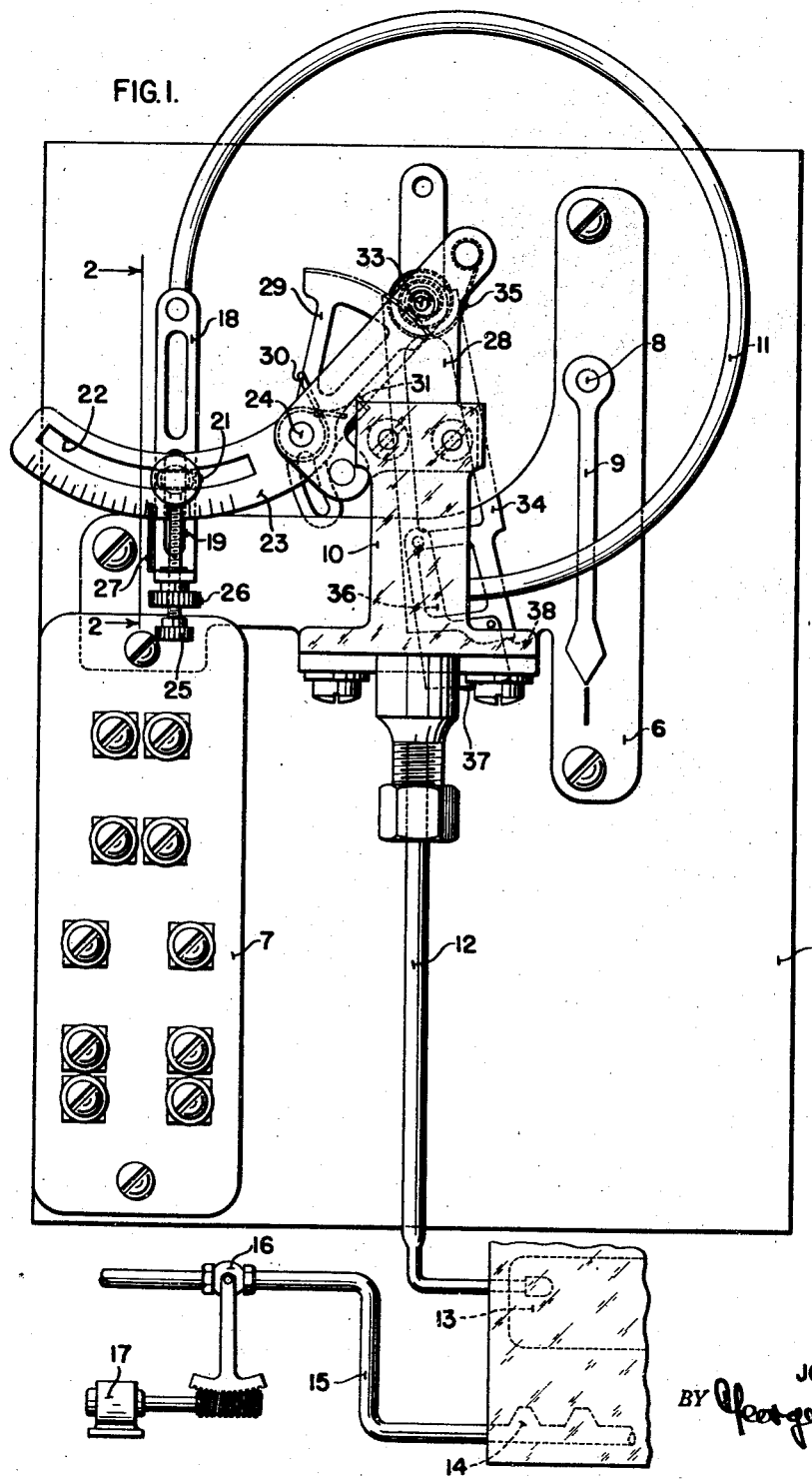
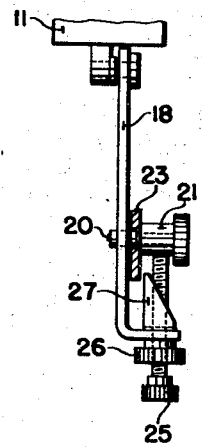
INVENTOR.
JOHN A. CALDWELL
BY
ATTORNEY Aug. 26, 1941.　　　J. A. CALDWELL　　　2,253,928
CONTROL INSTRUMENT
Filed Aug. 3, 1938　　　4 Sheets-Sheet 2

INVENTOR.
JOHN A. CALDWELL
BY
ATTORNEY

Aug. 26, 1941.　　　　J. A. CALDWELL　　　　2,253,928
CONTROL INSTRUMENT
Filed Aug. 3, 1938　　　　4 Sheets-Sheet 3
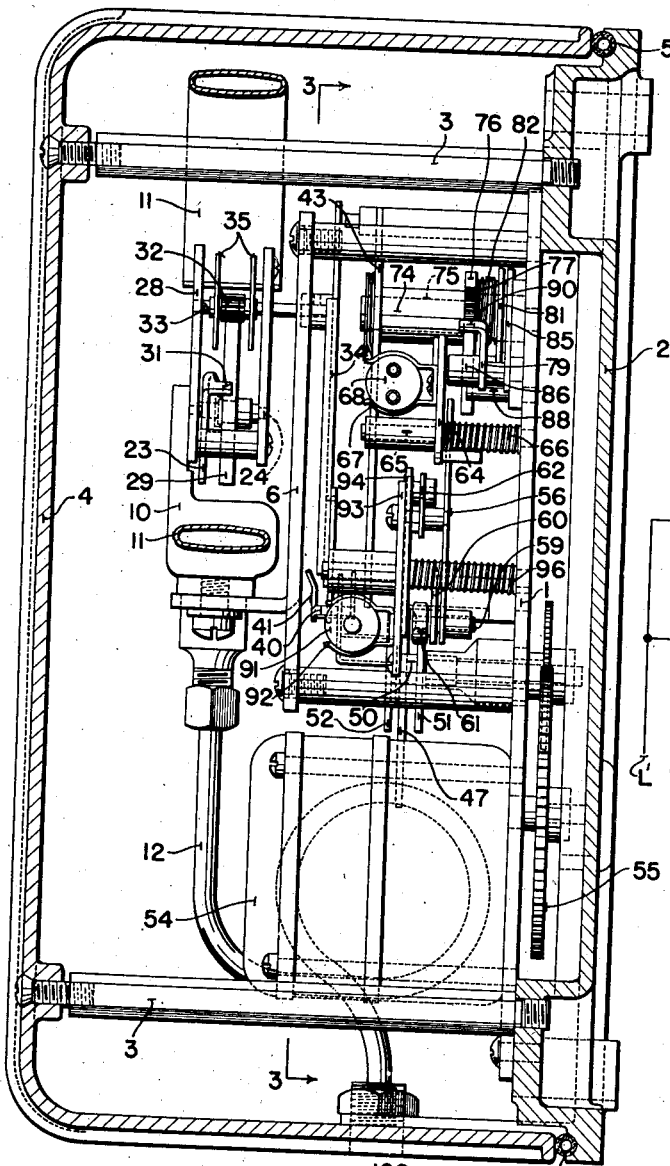

Aug. 26, 1941.   J. A. CALDWELL   2,253,928
CONTROL INSTRUMENT
Filed Aug. 3, 1938   4 Sheets—Sheet 4
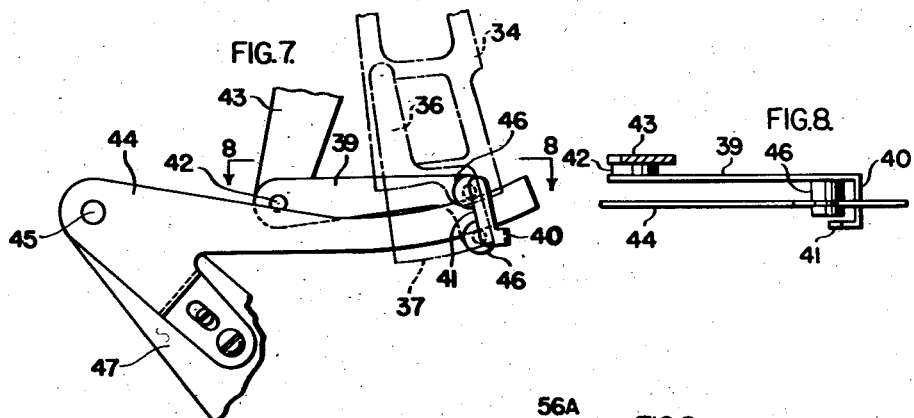
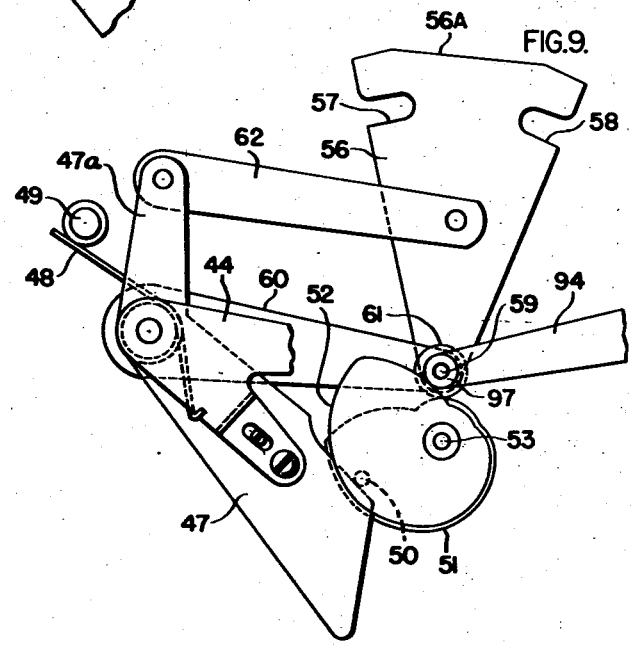
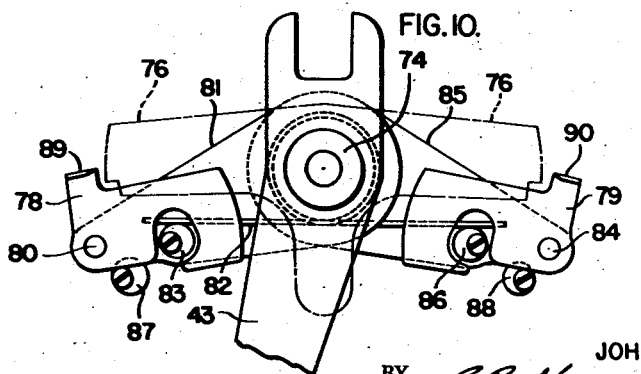
INVENTOR.
JOHN A. CALDWELL
BY
ATTORNEY Patented Aug. 26, 1941

2,253,928

UNITED STATES PATENT OFFICE 2,253,928

CONTROL INSTRUMENT

John A. Caldwell, Philadelphia, Pa., assignor to The Brown Instrument Company, Philadelphia, Pa., a corporation of Pennsylvania Application August 3, 1938, Serial No. 222,823

22 Claims. (Cl. 200—56)

The general object of the present invention is to provide a means to control the energization of a motor in accordance with variations in some condition, such as pressure or temperature.

More specifically, I have devised a means for controlling a motor which is used to adjust the opening of a damper, valve, or other regulating device in order to regulate a condition which is responsive to said opening. In some applications, it is only necessary to keep, for example, the pressure of steam within fairly close limits. To this end, a slight drop in the steam pressure is used, in my regulator, to produce a slight opening of a draft or fuel valve. This produces a proportional control, within the limits for which the device is capable of operating, or a control in which a change in the value of the steam pressure is used to produce a proportional change in the opening of the damper or fuel valve.

In the form of my invention which is described below, I use a member which is responsive to steam pressure to adjust the path of movement of another member. The second member is periodically moved through one of a plurality of paths to energize a motor in one direction or the other to open or close a fuel supply valve to a heater for a boiler that generates the steam, in order to keep the steam pressure within desired limits.

The mechanism through which the two above-mentioned members produce the desired control effects may be of various forms. Advantageously, however, that mechanism includes two mercury switches, one for energizing the valve motor in each direction, the control levers of which are selectively moved according to the path the second member is following. A third switch in series with both of the other switches, or in a common motor line, is periodically opened and closed to regulate the time that the motor is energized in each operation and, therefore, the increment of movement of the valve for each change in pressure of the steam.

Although I describe the use of my invention as being responsive to steam pressure, it is obvious that the device could be responsive to any change in pressure, such as draft pressure in a furnace or water pressure. In fact, the instrument may be used to control any condition which can be made to produce a change in dimension of some measuring element.

The various features of novelty which characterize my invenıton are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a front view of my control instrument;

Fig. 2 is a sectional view taken on line 2—2 of Fig. 1;

Fig. 4 is a view looking from the right of Figs. 1 and 3 with the Bourdon tube broken away for the sake of clearness;

Fig. 5 is a wiring diagram;

Fig. 6 is a modified form of follow-up to be used in place of the one shown in Fig. 3;

Fig. 7 is a view of the feeler mechanism;

Fig. 8 is a view taken on line 8—8 of Fig. 7;

Fig. 9 is a view of the cams and the parts operated thereby, and

Fig. 10 is another view of the follow-up mechanism of Fig. 3.

Figure 3:
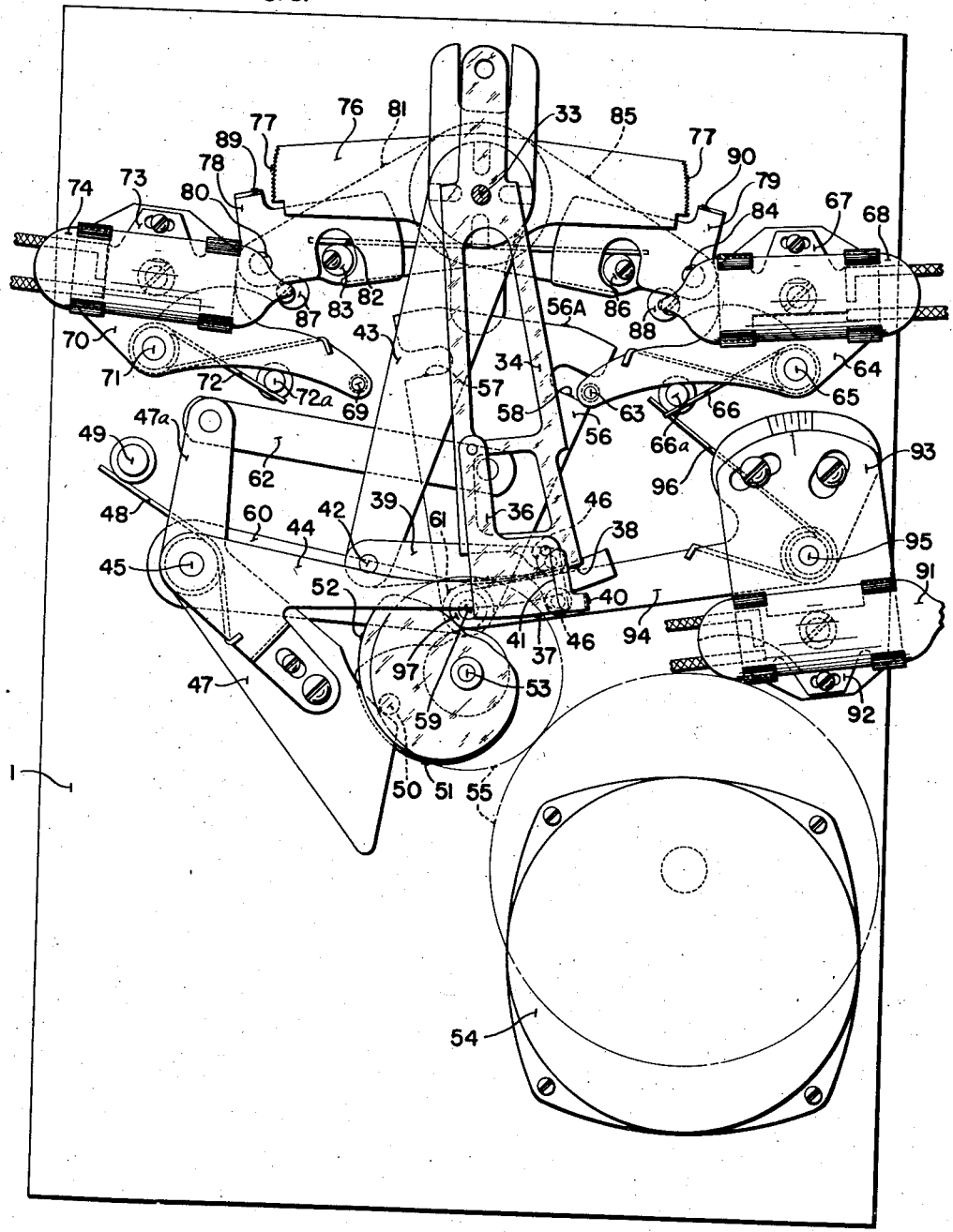
Fig. 3 is a view of my device taken on line 3—3 of Fig. 4.

The mechanism of my device is mounted on a plate 1 that is in turn attached to a support 2 of any suitable shape that may be mounted in some convenient location. A casing 4, taking the form of a box-like cover, is attached to the support 2 by studs 3 and serves to protect the mechanism of the instrument from dust and undesirable fumes. In furtherance of this object, a gasket 5 of rubber, or other material, is provided between the cover 4 and support 2.

A support for a pressure responsive element 11 consists of another and smaller plate 6 that is fastened to plate 1. The plate 6 also supports a terminal block 7, for leads from the various mercury switches that are used, and a pin 8 upon which is pivoted a freely swinging pointer 9 that, in cooperation with a mark on the plate 6, is used to indicate when the instrument is level.

There is provided on plate 6, a support 10 for the pressure responsive element taking the form of a Bourdon tube 11 that is responsive to the pressure being measured, which, in this case, is illustrated as being steam pressure in a boiler 13 to which it is connected by a tube 12. As the pressure in the boiler 13 is varied, changes in the size of the Bourdon tube 11 are used to control the fuel going to burner 14 through supply pipe 15 by varying the opening of valve 16. In order to accomplish this, there is provided a reversible motor 17 which, through suitable gearing, changes the opening of valve 16 in response to changes in steam pressure in a manner now to be described. It should be understood that if the Bourdon tube was, for example, responsive to changes in furnace pressure, the motor 17 could be used as a damper motor to vary the opening of a suitable damper.

Variations in size of the Bourdon tube 11 are transmitted to a pointer member which in turn controls the movement of a switch actuating member for the circuits of motor 17. The connections between the Bourdon tube and the pointer are shown best in Fig. 1 and consist of a link 18 pivoted at one end to the tube 11 and having a slot 19 in its other end. A screw 20, having a groove in its head to be received in slot 19, has a clamping nut 21 on its other end so that the screw can be adjustably received at any point along the length of slot 22 in lever member 23 which is pivoted at 24 on a support 26 attached to support 6. By adjusting screw 20 along slot 22, the differential or responsive range of the device can be adjusted. In other words, if screw 20 is adjusted to the left in Fig. 1, the lever 23 will be moved through a smaller arc for a given change in size of the Bourdon tube due to a given change in the pressure to which it is responsive than it would be moved if the screw 20 is adjusted to the right, nearer pivot 24. Provision is made for adjusting the position of lever 23 lengthwise of link 18 for setting the apparatus correctly at its neutral position. Such an adjustment consists of screw 25 that threads through a bent-over portion on the lower end of link 18, see Fig. 2, and bears against the lower side of nut 21. There is also provided a lock nut 26 for screw 25 and a pointer 27 on link 18 cooperating with a scale on the lower edge of link 23 to indicate the differential setting being used.

A segment 29 for transferring the movement of lever 23 to the pointer is also pivotally mounted at 24 and is held by spring 30 against inturned edge 31 of lever 23. This connection forms what may be termed an overload release, since if the Bourdon tube 11 is subjected to excessive pressure, the lever 23 can move independently of the segment 29 against the bias of spring 30. The teeth of the segment 29 are in mesh with a pinion 32 on a shaft 33 that has attached to its other end, between plates 1 and 6, the above-mentioned pointer 34. The pinion 32 and pointer 34 are biased in a clockwise direction by a pair of hair springs 35 in order to prevent any back lash in the gearing and thus make the instrument more sensitive. In order to provide various control steps on the pointer 34, a plate 36 is attached thereto in such a manner that its lower edge projects below that of pointer 34 and provides, with the pointer, edges 37 and 38. A third control position is provided when the pointer is moved to the left to such an extent that both edges 37 and 38 are out of the path of movement of a feeler, now to be described.

A feeler 39 that is provided with an engaging edge 40 and a guide 41, is pivotally mounted at 42 on the lower end of a support 43 and is periodically moved from a position in which edge 40 is below edge 37 into engagement with edge 37 or 38 or beyond them, depending upon the position of pointer 34 and the then value of steam pressure of boiler 13. This movement is provided by the oscillation of bell-crank 44 which is pivoted at 45 and is provided with one arm extending in a generally horizontal direction that is received between rollers 46 on the feeler 39. The other arm of bell-crank 44 is fastened to a second bell-crank 47, and the two are biased in a counter-clockwise direction around pivot 45 by a spring 48 into a position limited by contact between edge 40 and one of the edges 37 or 38, or by engagement between the upper arm 47a of bell-crank 47 and a stop pin 49.

The bell-cranks 44 and 47 are periodically moved clockwise against the bias of spring 48 in order to free the pointer 34 so that it may take a new position. This movement is accomplished by a roller 50, supported between two cams 51 and 52, that, upon rotation of the cams in a counter-clockwise direction, engages the top edge of the lower arm of bell-crank 47. These cams 51 and 52 are mounted on shaft 53 and are rotated at a constant speed by motor 54 through gearing 55 which is received in a recess in support 2 back of plate 1.

The ultimate position of feeler 39 on its upward excursion is used to position a switch actuating member. This member is then moved through a path to close one or the other of, or neither of, a pair of control switches, depending upon the then value of the pressure in boiler 13. If one of the control switches is closed, the actuating member also gives a follow-up movement to the feeler 39 so that the instrument will then control at a different pressure within its adjusted range.

The above-mentioned switch actuating member consists of a triangular plate 56, provided in its side edges with slots 57 and 58, that is pivoted at its lower end to a stud shaft 59 which is supported by a link 60 movable around stud shaft 45. The stud shaft 59 is provided with a roller 61 that rests on the surface of cam 51. Positioning of the actuating member 56 is accomplished by a link 62 that is fastened at one end to the center of member 56 and at its other end to the upper arm 47a of bell-crank 47. It is noted that link 62 extends parallel to link 60, for a purpose to be later described.

From the above described arrangement of parts, it can readily be seen that as the pressure in boiler 13 varies, the position of pointer 34 will vary. Thus if the boiler pressure is at its desired value, pointer 34 will be in such a position that, upon its upward stroke, edge 40 of feeler 39 will engage edge 38. The movement of bell-cranks 44 and 47 will then be stopped at a time when bell-crank 47, through link 62, has moved actuating member 56 to a vertical position. If the pressure in boiler 13 is high, the pointer 34 will be moved counter-clockwise, and edge 40 will on its up-stroke engage edge 37. Since bell-crank 47 does not move counter-clockwise so much as when the pressure is at its desired value, the link 62 will hold actuating member 56 in a position tilted to the right of the vertical. In a similar manner, if the pressure is low, edge 40 on its up-stroke will pass to the right of edge 38, and movement of the bell-cranks will be stopped by engagement of arm 47a with stop pin 49. Thus, link 62 will pull member 56 to a position to the left of vertical.

When actuating member 56 is moved to the right of vertical due to high pressure, its slot 58 will encircle a pin 63 on a pivoted mercury switch support 64. This support 64 is pivoted at 65 and biased in a counter-clockwise direction by a spring 66 against a stop 66a. Adjustably mounted on the support 64 is a bracket 67 that supports a mercury switch 68 which is in circuit with one of the fields of reversible motor 17. When the actuating member 56 is tilted to the left of vertical due to low pressure, its slot 57 encircles a pin 69 on one end of a switch support 70 that is pivoted at 71 and biased in a clockwise direction by a spring 72 against a stop 72a. Adjustably fastened to the support 70 is a bracket 73 for mercury switch 75 that is in circuit with the other field of motor 17.

Just after roller 50 has run off the upper edge of bell-crank 47, which on its up-stroke has caused edge 40 to set the member 56, the high portion of cam 51 will start under roller 61 to raise the actuating member 56. Due to the fact that links 60 and 62 are parallel, the inclination of member 56 will remain the same during its lifting movement; therefore, if, for example, slot 57 is encircling pin 69, it will remain at that inclination for its entire movement. If there was a change in the pressure in boiler 13 from that of the previous cycle of the instrument, the actuating plate 56 will be tilted, and just prior to the end of its up-stroke, a follow-up movement will be given to the feeler 39 by a means now to be described.

The support 43 for the feeler 39 is attached to a sleeve 74 (see Fig. 4) rotatable on a shaft 75 mounted on plate 1. Attached to the rear of the sleeve 74 is a cross-piece 76 that has ratchet teeth 77 formed in each end. The construction is such that as the cross-piece 76 is moved, the sleeve 74 and support 43 will also be moved around shaft 75 to shift feeler 39 along the horizontally extending arm of bell-crank 44. Movement of this feeler is accomplished by actuation of one or the other of a pair of over-weighted pawls 78 and 79 that have a gravitational bias respectively in a clockwise and counter-clockwise direction. The pawl 78 is pivotally mounted at 80 on a lever member 81 that is mounted to move around shaft 75 and is biased counterclockwise by engagement between one end of spring 82 and an eccentric pin 83 mounted on lever 81. In a like manner, the pawl 79 is pivotally mounted at 84 on one end of a lever member 85, also mounted on shaft 75, that is biased clockwise by the engagement between the other end of spring 82 and an eccentric pin 86. Downward movement of the pawls 78 and 79 and their supporting levers is adjustably limited by engagement between them and eccentric pins 87 and 88 respectively.

From the above, it will be seen that the follow-up movement of feeler 39 is obtained in the following manner. Just prior to the time member 56 reaches the upper limit of its movement, its upper edge 56A, if member 56 has been tilted to the left, will engage eccentric pin 83 and start moving lever 81 and its pawl 78 in a clockwise direction. As this occurs, pawl 78 will also turn clockwise around its pivot 80 on lever 81 to bring its edge 89 into engagement with one of the teeth 77 and thus move cross-member 76 to shift feeler 39 to the left. The amount of movement of cross-piece 76 will be the distance of one tooth 77. In a similar manner, if member 56 is tilted to the right, on its upward movement edge 90 of pawl 79 will be brought into engagement with one of the right hand teeth 77 to shift feeler 39 to the right. The amount of follow-up movement given to members 76 and 39 can be varied by changing the adjustment of pins 87 and 88 to raise or lower the pawl carrying members 81 and 85 and thereby vary the amount they will be moved by edge 56A of member 56.

In order to insure the energization of motor 17 in either one direction or the other for a predetermined time each cycle, there is provided a switch 91 in the common line to motor 17 which breaks the circuit thereto a predetermined time after either switch 68 or switch 74 has been closed. This switch 91 is mounted in bracket 92 that is adjustably fastened to support 93, which is in turn adjustably fastened to a lever 94. Lever 94 is biased in a counter-clockwise direction around its pivot 95 by a spring 96 so that a roller 97 on its outer end is riding on the surface of cam 52. Inasmuch as cam 52 is in fixed relation to cam 51, which raises member 56 to close switch 68 or switch 74, the lever 94 will be moved in timed relation thereto to open switch 91 a given length of time after switches 68 or 74 have been closed. Thus, motor 17 is energized for equal increments of time for each cycle of the instrument.

In the operation of the instrument, the pointer 34 is positioned by the Bourdon tube 11 in accordance with the value of the steam pressure in boiler 13. Thereafter as roller 50 moves along the edge of the lower arm of bell-crank 47, that member along with bell-crank 44 will rise under the bias of spring 48 until the edge 40 engages either edge 37 or edge 38, or passes to the right of pointer 34. If, for example, the steam pressure is low, the edge 40 will pass to the right of pointer 34, and link 62 will move actuating member 56 to the left of the vertical so that slot 57 encircles pin 69 on mercury switch support 70.

At this time, the cam 51 will start to raise roller 61 and actuating member 56 so that switch 74 will be closed. Motor 17 will then be run in a direction to open valve 16 and supply more fuel to the burner 14. The motor 17 will continue to rotate until cam 50 has tilted bracket 94 enough to open switch 91 and break the motor circuit. Thus, the motor has opened the valve 16 a given amount, and if the steam pressure is still undesirably low upon the next cycle of the instrument, the motor 17 will be run for the same length of time in the same direction to open the valve further.

Just prior to the time actuating member 56 reaches the top of its stroke, its edge 56A will engage the pin 83 on lever 81 to bring edge 89 of pawl 78 into engagement with one of the teeth 77. Continued movement of member 56 will then move lever 76 clockwise so that arm 43 attached thereto will shift feeler 39 and edge 40 to the left. This in effect gives a follow-up movement to edge 40 and, at the same time, permits the instrument to control at a lower pressure.

If the drop in pressure is a predetermined amount governed by the adjustment of pin 87, the next time edge 40 rises it will, due to its shifting to the left, engage edge 38, and no further control action will be made. The amount that feeler 39 can be shifted to the right or left determines the limits of the range through which the pressure of the boiler 13 is permitted to vary. Between these limits, the valve 16 will be given a small adjustment, and due to the follow-up of feeler 39, the instrument will energize the motor 17 in a manner calculated to make the valve position correspond to the existing pressure value. This proportional action will take place within the range determined by the range of action of part 76, and beyond that range in either direction the motor will be energized in each cycle of the instrument to open the valve 16 and supply more fuel to burner 14 until the steam pressure has returned to some value within its normal range.

If the pressure has increased, edge 40 will engage edge 37 of feeler 34 to move actuating member 56 to the right and close switch 68. This cycle of the instrument will also give a follow-up movement of feeler 39 to the right to reverse the above-described operation.

A modified form of mechanism to procure the follow-up movement of feeler 39 is shown in Fig. 6. In the follow-up mechanism shown in Fig. 3, a pawl and ratchet mechanism was used, and the amount of follow-up was determined by the setting of eccentric screws 87 and 88. The follow-up of Fig. 6 differs therefrom in that there is disclosed in that figure a friction type follow-up which is disengaged after a predetermined movement of member 76 and the feeler 39.

A tubular sleeve 101, serving the same purpose as shaft 74 of Fig. 4, is extended forward from the supporting plate 1 of the instrument. Rotatable on this sleeve is the member 176 that carries the support 43 to which the feeler 39 is attached. Also rotatably mounted on sleeve 101 is a pawl supporting member 104 that is provided with a backwardly extending lug 105. The member 104 is normally held in a horizontal position by a coil spring 106 encircling sleeve 101, the upstanding ends of which are crossed, as indicated at 107, and engage the lug 105 and a pin 108 extending from plate 1. In this manner, any tilting movement of the member 104 is opposed by one of the ends of the spring 106. Pivotally mounted at 109 on the right end of member 104 is a pawl 110 which has a lug 111 extending through opening 102 that is adapted to be engaged by the edge 56A of actuating member 56 and a clutch edge 112 which is adapted to engage the edge 113 of member 176. In a like manner, a pawl 114 is pivoted on member 104 at 115 and has a lug 116 extending through opening 103 and a clutch edge 117 adapted to engage edge 118 of member 176.

Downward movement of the pawls 110 and 114 is limited by the engagement of their inner ends with a collar 119 on sleeve 101, and upward movement of the inner ends of the pawls is limited by eccentric pins 120 and 121 respectively.

In the operation of this embodiment, if member 56 is in a vertical position, indicating normal pressure, it will pass between lugs 111 and 116 on its up-stroke, and no movement of member 176 will occur. If, however, member 56 is tilted, for example, to the right, it will first close switch 68, and thereafter edge 56A will engage lug 111 to raise the lug. Upon engagement of lug 111, the pawl 110 will move around its pivot to bring its edge 112 into engagement with edge 113 of member 176 to move the latter and shift feeler 39 to the right. This movement continues until the upper edge of pawl 110 engages the eccentric pin 120, at which time continued movement of the pawl will pivot it around the pin 120 and move edge 112 out of engagement with edge 113. Thus member 176 is moved from the time edge 112 engages edge 113 until the pawl 110 engages pin 120, which movement can be varied by adjusting the eccentric pin. In a similar manner, the member 176 will be moved in the opposite direction if edge 56A engages lug 116 of pawl 114.

In either embodiment of the invention, the follow-up movement can be made different for rising or falling pressure by merely changing the adjustment of pins 87 and 88 or 120 and 121 relative to each other.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In an instrument to control the value of a condition between normal limits, a first member positioned in accordance with the value of said condition, a periodically moved member, means to move said second member through a path wherein it will engage said first member or not, depending upon the value of the condition, a part positioned in accordance with the position of said second member, means to move said part, and means moved by said part to adjust said second member in a direction to off-set the effect of movement of said first member.

2. In a control instrument, a first member having an edge with a step therein movable in accordance with variations in a measurable condition, a second periodically moving member adapted to engage said edge, said step, or to pass beyond said step depending upon the value of said condition and therefore the position of said first member, a part positioned by said second member, means to move said part through a path depending upon its position, and means engaged by said part during its movement to shift said second member toward a position where it will engage said step.

3. In a control instrument, a part having slots in it, a first and a second tiltable lever, each lever having a projection on one end and each projection being adapted to be encircled by one of said slots, means to position said part in accordance with the value of a condition, the position of said part being such that if the condition is above a normal value, one slot will encircle one projection, and if the condition is below normal, the other slot will encircle the other projection, means to move said part whereby the corresponding lever will be tilted, and means responsive to the tilting of said lever to adjust the condition toward normal.

4. In a control instrument, the combination with a pair of tiltable levers, a part adapted to individually move said levers, means to position said part in accordance with the value of a condition, the position of said part being such that if the condition is above its normal value, the part will be in position to tilt one lever, and if the condition is below normal, the part will be in position to tilt the other lever, means to move said part through a path depending upon its position to thereby tilt one or the other of said levers, means responsive to the tilting of said lever to adjust said condition toward normal, a third lever, means to move said third lever in synchronism with said part, and means responsive to movement of said third lever to limit the adjustment of the condition by said first levers.

5. In a control instrument, the combination with a member adjustable in accordance with the value of a condition to be controlled, said member being provided with an edge having a step in it, a periodically movable member adapted to engage said step if the condition is at a normal value, and adapted to engage said edge if the condition is to one side of normal, and to pass beyond said step if the condition is to the other side of normal, means to move said periodically movable member from a predetermined first position to a second position depending upon its engagement with said first member, a part positioned in accordance with the second position of said periodically movable member, means to move said part through a path, and means engaged by said part to shift said periodically movable member in a direction so that it will engage the step of said first member.

6. In a control instrument, the combination with a member positioned in accordance with the value of a measurable condition, said member being provided with an edge, a second member adapted to engage said edge or pass beyond it and being shiftable in a direction parallel to said edge, means to move said second member from a first predetermined position to a second position depending upon whether it engages said edge or not, a part positioned by said second member, means to move said part through a path depending upon its position, clutch means adapted to be engaged by said part as it moves, a lever connected to said second member and moved by said clutch means whereby said second member will be shifted along said edge upon movement of the part.

7. In a control instrument, the combination with a first member positioned in accordance with the value of a measurable condition, a second shiftable member, means to periodically move said second member into engagement with the first, a part positioned by said second member, means to move said part through a path, a lever connected to said second member, a pair of clutch members adapted to engage and move said lever, means to move said part into engagement with one of said clutch members depending upon its position to move said lever and shift said second member whereby the second member will engage said first member at a different point.

8. In a control instrument, the combination with a pivoted lever having teeth on each end, a pair of arms pivoted coaxially with said lever, an over-weighted clutch member on the free end of each arm, each clutch member adapted to engage one set of teeth to move said lever, a part, means to move said part through a predetermined path to engage one or the other of said clutch members, whereby said clutch member will move said lever, and means actuated by movement of said lever.

9. In a control instrument, the combination with a pivoted lever, an arm pivoted coaxial with said lever, a clutch member adapted to engage said lever mounted on each end of said arm, a part, means to move said part through a path to engage a clutch member whereby said clutch member will engage and move said lever, means to disengage said clutch, and means actuated by movement of said member.

10. In a control instrument, the combination with a measuring element and a control mechanism of means connecting said element and mechanism comprising a segment, a lever resiliently movable with respect to said segment, and means connecting said lever and element, the last-named means being adjustable in a plurality of planes.

11. The combination with a deflecting meter element, a pair of opposed electrical contact devices pivoted on individual substantially parallel axes, a part, an actuating member mounted on said part for oscillatory movement about a third axis parallel to the first-mentioned axes, means cooperating with said element and member to adjust the latter about said axis in accordance with the position of said element, means to give said part to-and-fro movements to oscillate said member over paths determined by the member adjusting means, said devices having portions adapted to be engaged by said member selectively in accordance with the path of travel of said member.

12. The combination of claim 11 in which said member adjusting means includes means for adjusting said member independently of said element in response to a movement of said member.

13. The combination of a mercury switch bracket mounted for rotation about an axis and having an actuating portion, a second mercury switch bracket mounted for rotation about a second axis and having an actuating portion, a member oscillated by power means over paths selectively determined by means responsive to a variable condition and adapted to selectively engage said actuating portions in accordance with its path of travel, and means responsive to the oscillation of said member to change the path of travel of said member.

14. Reversible motor control means including a pair of switches, an oscillatory member adapted to selectively operate one of said switches when constrained for movement along one path, to selectively operate the other of said switches when constrained for movement along a second path, and to engage neither switch on a movement along a third path, means responsive to a variable condition to constrain the movement of said member to said first or second path on a change in said condition, and means directly responsive to a movement of said member along said first or second path tending to constrain the movement of said member along said third path.

15. Reversible motor control means comprising electrical switching means, an oscillatory member for actuating said switching means, means for controlling said oscillatory member including a first element deflecting in accordance with the value of a condition and a second element actuated by said member and cooperating wth the first-mentioned element.

16. The combination of claim 15 in which said elements are adapted for periodic engagement and are formed with engaging surfaces configured to selectively position one of said elements on each engagement, and means linking the last-mentioned element and the member to determine the path of travel of the latter.

17. In apparatus of the class described, the combination of two switch-operating members, a pendulum whose position with respect to a neutral position is subject to change by a condition to be controlled by said apparatus, a rockable and bodily displaceable sector plate adapted to actuate one or the other or neither of said members depending on its position in the plane of its swing prior to its being bodily displaced, and means under the control of the pendulum for adjusting the position of said plate in said plane, said sector plate having side notches one at each radial side for establishing operative connection between the plate and said switch-operating members.

18. In apparatus of the class described, the combination of two switch-operating members, a pendulum whose position with respect to a neutral position is subject to change by a condition to be controlled by said apparatus, a rockable and bodily displaceable sector plate adapted to actuate one or the other or neither of said members depending on its position in the plane of its swing prior to its being bodily displaced, and means under the control of the pendulum for adjusting the position of said plate in said plane, means including a bell crank lever for rocking said plate, a finger extending across the plane of swing of said pendulum and carried by one of the arms of said lever, and means actuable by said plate for adjusting the position of said finger with respect to the fulcrum point of said lever, said pendulum being adapted to arrest the upward movement of said finger at one or the other of two different levels.

19. In apparatus of the class described, a pendulum whose position with respect to a neutral position is subject to change by a condition to be controlled by the apparatus, a sector plate and means including a bell crank lever for rocking the plate, constantly rotating means for raising and lowering said plate and for rocking said lever, a laterally extending arm carried by said lever, a finger extending across the plane of swing of said pendulum and carried by said arm, means adapted to be actuated by said plate for adjusting the position of said finger lengthwise of said arm, and circuit-controlling means adapted to be operated by said plate if the latter actuates the finger adjusting means, said pendulum being adapted to arrest the upward movement of said finger.

20. In the combination specified in claim 19, means operated by said constantly rotating means for controlling the effective circuit-control period of the circuit-controlling means.

21. In apparatus of the class described, a pendulum whose position with respect to a neutral position is subject to change by a condition to be controlled by the apparatus, vertically reciprocable finger extending across the plane of swing of the pendulum and adapted to be arrested in its upward movement by the pendulum at either of two levels, a laterally extending arm on which the finger is laterally adjustable, means including a T-shape lever for adjusting the position of the finger on said arm, and means for adjusting the position of said lever comprising a vertically reciprocable sector plate whose angular position may be adjusted with respect to the fulcrum of said lever, said angular position determining whether or not the lever will be adjusted.

22. In the combination specified in claim 21, circuit-controlling means adapted to be actuated by said plate if the angular position of the latter is such as to cause said lever to be adjusted.

JOHN A. CALDWELL.